United States Patent [19]

Schwiesow

[11] 4,168,906

[45] Sep. 25, 1979

[54] DIFFERENTIAL DOPPLER VELOCITY SENSOR

[75] Inventor: Ronald L. Schwiesow, Boulder, Colo.

[73] Assignee: The United States of America as represented by the Secretary of Commerce, Washington, D.C.

[21] Appl. No.: 897,818

[22] Filed: Apr. 19, 1978

[51] Int. Cl.$^2$ .............................................. G01P 3/36
[52] U.S. Cl. .......................................... 356/28; 343/8
[58] Field of Search ...................... 356/28, 28.5; 343/8

[56] References Cited

U.S. PATENT DOCUMENTS

| 3,915,572 | 10/1975 | Orloff | 356/28 |
|---|---|---|---|
| 4,026,655 | 5/1977 | Gunter, Jr. | 356/28 |
| 4,028,673 | 6/1977 | Taylor | 356/28 |
| 4,036,557 | 7/1977 | Christensen | 356/28 |
| 4,101,890 | 7/1978 | Goyard | 343/8 |

OTHER PUBLICATIONS

T. R. Lawrence et al., *The Review of Scientific Instruments*, vol. 43, No. 3, Mar. 1972.
Clark et al., *American Journal of Physics*, vol. 38, No. 5, p. 575, May 1970.
Schwiesow et al., *Applied Optics*, vol. 16, No. 5, p. 1145.

*Primary Examiner*—S. C. Buczinski

*Attorney, Agent, or Firm*—Eugene J. Pawlikowski; Alvin J. Englert

[57] ABSTRACT

A sensor for measuring the velocity components of particles in an atmospheric volume which comprises means for generating first and second coherent radiation beams, means for directing said first and second radiation beams towards said particles, said beams being spaced apart and positioned to intersect each other in the region of said particles, said particles having a longitudinal velocity component along the bisector of said beams and a transverse velocity component perpendicular thereto, means for receiving Doppler-shifted radiation back-scattered from said first and second beams, a reference beam of radiation temporally coherent to said first and second coherent beams, means for mixing said temporally coherent, reference radiation with said received Doppler-shifted radiation for detecting a beat frequency spectrum, and means connected to receive said beat frequency spectrum for determining from the frequency values of said beat frequency spectrum, the average longitudinal and transverse velocity components of said particles. A method of measuring the velocity components of particles utilizing separate radiation beams and a radiation reference source used as a local oscillator is also disclosed.

30 Claims, 7 Drawing Figures fig.1.

DIFFERENTIAL DOPPLER VELOCITY SENSOR

STATEMENT OF GOVERNMENT INTEREST

The invention described herein was made by an employee of the U.S. Government and may be manufactured by or for the government for governmental purposes without the payment of any royalties thereon or therefor.

BACKGROUND OF THE INVENTION

This invention relates to laser Doppler velocity sensors of the type used to measure the velocity of a number of aerosol or other particles in an atmospheric volume and, more particularly, to such a sensor which is capable of effectively measuring the three velocity components of said particles from a remote site.

Laser Doppler sensors are finding increasing use to optically measure such things as the velocity of flow of air or liquids. Such a velocimeter can provide a dynamic measurement of flow velocity without requiring a probe or other structure to be located in the flow and disturbing it. For example, a so-called laser velocimeter provides a velocity measurement of a fluid by focusing one or more coherent beams of laser light onto a point within a fluid stream containing particles having diameters on the order of the laser light wavelength. Such particles will "scatter" the light radiation by the Mie scattering process, and shift its wavelength by an amount dependent upon its velocity and, hence, the velocity of the fluid. Such Doppler shifting of the wavelength is measured by various techniques to provide a scaler measurement of the velocity of the particle along at least one path.

Many modern laser Doppler velocimeters are of the so-called "dual scatter" kind. Such instruments include a pair of coherent beams which are focused to a crossing point at the location at which it is desired that the velocity of the particle be measured. A fringe field is thereby formed at the beam crossing location due to beam interference. As a particle moves through such a fringe field, the light intensity scattered therefrom is modulated at a frequency which is proportional to the scaler component of the velocity of such particle in a direction which lies in a plane normal to the bisector of the beam angle at their point of incidence on the particle and also in the plane of the beams. Collection of such intensity-modulated scattered light radiation by a photodetector provides a measurement of such velocity component.

In general, dual-scatter velocimeters measure only the component of the velocity of the particle perpendicular to the beam angle bisector and in the plane of the beams. Thus, to obtain a true indication of the flow velocity, a plurality of velocimeter systems must be provided, all focused on the same location in the flow to separately measure different velocity components which can then be combined to provide the actual velocity. This utilization of a plurality of systems not only increases the expense due to system duplication, but also reduces the accuracy of the velocity determination due to the adding of potential errors in the systems. Moreover, in some of such systems, each of the detectors receives scatter from more than one of the incident beams, with the result that expensive, special discrimination electronics or optics must be used before reliable measurements can be obtained. In addition, and perhaps most significantly, present available dual-scatter backscatter velocimeters are incapable of measuring the velocity component which lies directly along the axis of the system formed by the bisector of the two beams, thus making a measurement of the vector velocity quite difficult.

The other common configuration for a laser Doppler velocimeter is the "local oscillator" or "on axis" arrangement. Such instruments utilize a single illumination beam focused at the location where particle velocity is to be measured. The scattered radiation is Doppler shifted by particle motion. This frequency-shifted radiation is mixed with radiation of a known frequency on a suitable detector. The frequency difference between the scattered and known radiation provides a measurement of such velocity component.

Most practical local oscillator velocimeters collect the scattered radiation back along the same axis as the transmitted beam. These units measure only the component of the velocity of the particle parallel to the beam axis. Measurement of three velocity components requires a plurality of systems illuminating the sample region from different directions.

U.S. Pat. No. 3,915,572 to Orloff, discloses a combined dual-scatter, local oscillator Doppler velocimeter capable of simultaneously generating signals representative of components of the flow velocity of a liquid in directions both transverse to and along the transmitting axis of the system. This system does not require total duplication of systems in order to measure these two different velocity components. The transverse component in the Orloff patent is measured without reference to the frequency of the transmitted electromagnetic radiation, so that no heterodyning occurs. In the instant invention, as will become clear from the following disclosure, the component of velocity in the transvers direction is determined by a completely different technique. Orloff has simply combined a conventional "dual-scatter" system and a conventional "on-axis" (longitudinal) homodyne system in a novel way.

In many instances, it is desirable to measure the three velocity components of a number of aerosol or other particles in an atmospheric volume from a site remote from that volume. Electromagnetic radiation is usually used as a probe, because it will not adversely effect such measurements. As long as the aerosols are sufficiently small, measurement of the aerosol velocity in effect measures the wind velocity. Because wind velocities are three-dimensional, rather than one- or two-dimensional, it is desirable to obtain a complete measure of all of the velocity components utilizing one instrument. In many instances, the desired wind information cannot be obtained by displacement of on-site anemometers. Such uses as atmospheric boundary layer research, velocities in tornadoes, dynamics of clouds, airport approach path wind shear, aircraft speed, pollution dispersal, ballistics, and wind energy assessment, require remote measurement of velocity components because of the impracticability of utilizing on-site anemometers.

Previous single-beam heterodyne-homodyne Doppler frequency measurements using electromagnetic radiation measure only the line-of-sight component of velocity, not the transverse component. Multiple units have been used independently from sites far separated in angle to measure multiple wind components. The present invention, however, analyzes closely-spaced, multiple signals together on an instantaneous basis, in contrast to the separate frequency analysis used on each beam in the prior art.

In addition, intersecting-beam or dual-scatter "Doppler" velocimeters are well known. However, in the prior art, the return signal is not mixed with a reference signal. The amplitude fluctuations detected yield a frequency proportional to the transverse velocity. If the number of scatterers in the sensing volume is large, the amplitude fluctuations become very small. No information is available on the velocity component parallel to the beam bisector. In contrast, the present invention uses a reference signal to measure the frequency of the return signals and not only their amplitude. Also, heterodyne or homodyne operation is an inherent part of the present invention, whereas dual-scatter systems use only direct detection.

OBJECTS OF THE INVENTION

Therefore, it is an object of the present invention to provide for the remote measurement of the three velocity components of aerosols or other particles in an atmospheric volume, using electromagnetic radiation as a probe.

Another object of the present invention is to obtain the two or three velocity components of wind in instances where the placement of on-site anemometers is not practical.

Still another object of the invention is to provide measurement of all three velocity components of a target at a remote point using the same analytic apparatus for each component.

A still further object of the invention is to provide a differential Doppler analysis carried out in a full coherent manner.

Still another object of the invention is to provide a signal processing technique for Doppler velocity measurements at ranges of at least 30 m.

SUMMARY OF THE INVENTION

Consistent with the objects enumerated above, the present invention provides a differential Doppler velocity sensor utilizing electromagnetic radiation, such as a laser, as a probe. In a preferred embodiment, two electromagnetic radiation beams are transmitted so as to intersect in a region in space. The electromagnetic radiation scattered from a target moving through this region is shifted in frequency in an amount proportional to the velocity components along the beams. Frequency shift is measured by mixing the frequency-shifted return radiation with unshifted radiation and detecting the beat frequency. The beat from each of the intersecting beams will be different from the other because each measures a slightly different component of the target particles' velocity. If a single detector is used, three beat frequencies will be present for each target. This set of frequencies comprises a triplet wherein the center frequency has approximately twice the intensity of either the higher- or lower-frequency component. The average frequency value of the beat spectrum is proportional to the velocity component along the beam bisector. Mixing the beat signal from each beam with that of the other produces an intra-beat spectrum. The difference between main and sidelobe peaks in the intra-peak spectrum is proportional to the transverse velocity component of the moving target, as measured in the plane defined by the two beams.

When many targets with different velocities are in the sensitive beam-intersection region, the resultant frequency triplets are spread over many different frequency values since typically many different velocity components will be present. This spreading prevents resolution of any clear triplet. However, the frequency spacing between a sidelobe and a main peak (proportional to the particle transverse velocity component) in a triplet is largely constant and may be determined by mixing the sum of the triplets with itself to obtain an intra-triplet beat spectrum. The average frequency value of the sum of the triplets is proportional to the average longitudinal component of the particles and the sidelobe-main lobe frequency spacing of the intra-triplet beat spectrum (equal to the main lobe to zero frequency spacing) is proportional to the average transverse velocity component of the particles in the plane of the two intersecting beams.

For multi-particle measurements using two laser sources of fixed frequency relationship and two separate detectors, the measured spectrum in each detector is a sum of couplets. The average of each couplet spectrum is then averaged to determine the average longitudinal velocity component of the plurality of particles, and the intra-couplet frequency spectrum is utilized (peak to zero frequency spacing) to determine the average transverse velocity component of the plurality of particles.

A unique feature in accordance with the principles of the invention is to utilize a temporally coherent radiation source as a reference local oscillator to mix with the back-scattered radiation and to derive both longitudinal and transverse velocity components from the resulting beat spectrum. The use of the temporally coherent local oscillator gives a strong triplet (or couplet in another embodiment of the invention) which enables the processing thereof to obtain the intra-triplet (intra-couplet) beat spectrum.

The invention includes other features and advantages which will become apparent from the following more detailed description of the preferred embodiment, together with the following drawings, wherein like elements are indicated by the same number in all of the figures.

DETAILED DESCRIPTION OF THE PREFERRED EMBODIMENT

Figures 1, 2:
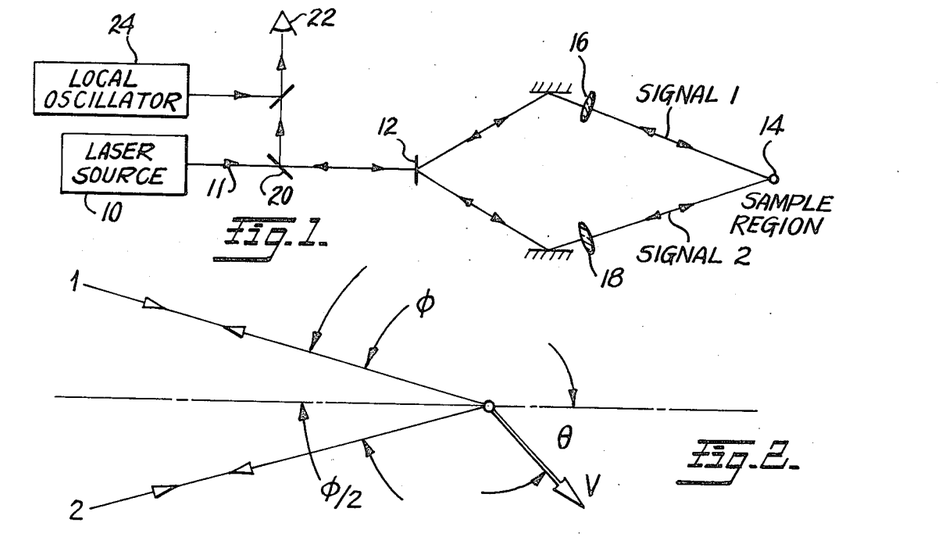
FIG. 1 is a schematic diagram showing apparatus used for the coherent differential Doppler measurements.
FIG. 2 is a diagram of the scattering geometry used for remote lidar sensing of transverse velocity at a point.

A technique of the instant invention comprises illuminating a region of the atmosphere with two coherent, focused beams converging at a small angle (approximately 6 mrad) and intersecting at a common focus. A scatterer in the focal volume simultaneously scatters radiation back along each transmitted beam direction and from each transmitted beam into the other. If the scatterer is in motion, the frequency of the scattered radiation will in general be different in each direction. At a single detector, the four scattered signals are combined with each other and with a relatively much more powerful optical local oscillator in a homodyne or heterodyne mode on a single detector. A schematic diagram of the optical arrangement is shown in FIG. 1. The laser source 10 generates a laser beam 11 which is divided by beam divider 12 and focused at the sample region 14 by optical elements 16 and 18. Scattered radiation is collected and recollimated by the same system used to direct the laser radiation. At beam splitter 20, the four signals (1 back to 1, 2 into 1, 1 into 2 and 2 back to 2) are directed to a detector 22 where they are combined with a local oscillator 24. The output of the detector contains a triplet of radio frequency signals. Modifications of this basic procedure, such as using a separate detector and local oscillator offset for each received signal to remove sign ambiguity are possible.

The invention has been tested experimentally and described by Schwiesow et al in *Applied Optics*, Vol. 16, No. 5, 1145 (1977), incorporated herein by reference. Homodyne detection was utilized for simplicity. Target velocity was controlled to assure that the optical homodyne beat was well removed from zero frequency so that no spectral folding occurred. For purposes of general analysis it is easiest to assume heterodyne operation so that in even the general case where the longitudinal (line-of-sight) velocity component may go to zero, spectral folding about zero frequency is avoided.

For a scatterer of velocity V at an angle $\theta$ with the lidar axis (bisector of the transmitter beams) and an incident beam convergence angle of $\phi$ between beams as shown in FIG. 2, the three Doppler frequency shifts (from the fixed local oscillator to transmitter frequency difference) for an incident laser frequency $\nu$ are $$\Delta\nu_0 = (-2\nu V/c)(\cos\theta \cos\phi/2), \qquad (1)$$

$$\Delta\nu_1 = (-2\nu V/c)(\cos\theta \cos\phi/2 + \sin\theta \sin\phi/2),$$

and $$\Delta\nu_2 = (-2\nu V/c)(\cos\theta \cos\phi/2 - \sin\theta \sin\phi/2).$$

The optical signals with these frequency shifts yield a radio frequency triplet that results from coherent optical heterodyne detection in the photodiode detector. The interbeam frequency component at $\Delta\nu_0$ should be twice the intensity of either wing of the triplet. Approximating $\cos\phi/2 \approx 1$ and $\sin\phi/2 \approx \phi/2$ since $\phi$ is very small, we can write the average frequency shift of the triplet from the local oscillator offset as $f_L$, where $$f_L = |(-2\nu V/c)\cos\theta|. \qquad (2)$$

Figure 3:
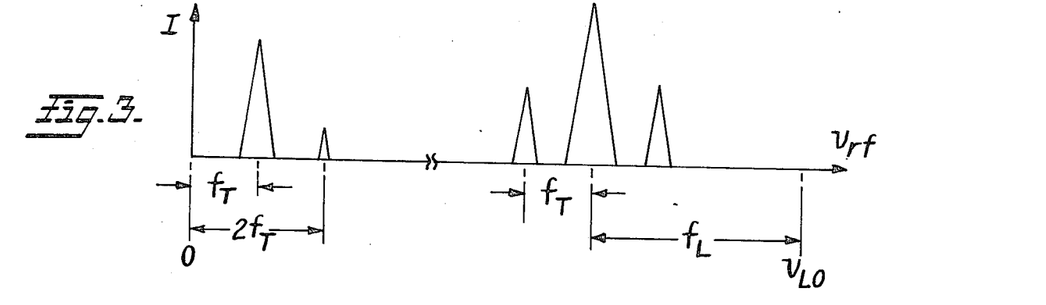
FIG. 3 is a graph of the optical heterodyne frequency spectrum showing the triplet centered at $F_L$ from the local oscillator.

This situation is illustrated schematically in FIG. 3, showing the triplet centered at $f_L$ from the local oscillator frequency and the resolved intra-triplet beat spectrum resulting from non-linear detection. Frequency $f_L$ is proportional to the longitudinal component of the velocity and $f_T$ is proportional to the transverse component.

The radio frequency triplet centered at $f_L$ arises from a linear translation process, namely the subtraction of the local oscillator frequency from the optical triplet frequencies. To conveniently measure the spacing between frequencies in the triplet, the resulting radio frequency triplet is passed through a non-linear device, for example a diode, to give a beat frequency between the frequencies comprising the triplet. After such non-linear detection the frequency difference between the center of the triplet and either sideband is $f_T$, where $$f_T = |(-\nu V/c)\phi \sin\theta|. \qquad (3)$$

This triplet spacing frequency is a result of a radio frequency non-linear detection process. An additional beat between the two sidebands of the triplet will occur at a frequency $2f_T$ and will be down in intensity by a factor of 4 below the signal at $f_T$.

To a very good approximation, the average frequency of the triplet is proportional to the longitudinal (along lidar axis) component of the velocity $V_L$, and the beat (difference) between either sideband and the center frequency gives the transverse (perpendicular to lidar axis) component of the velocity $V_T$ in the plane of the transmitted beams.

A key consideration for the practical application of the instant invention is the effect of atmospheric refractive index fluctuations on the transmitted and received signals. Heterodyning requires temporal coherence along each ray so that efficient mixing with the local oscillator can occur. Each separate path need not be phase coherent with the other since the signal scattered back along the transmitted path and that scattered from one path to the other are mixed separately with the local oscillator.

The analysis contrasts the temporal coherence requirements of the coherent system with the more familiar spatial coherence requirements associated with amplitude scintillation patterns. Experimentally, one could study temporal coherence with an unequal-arm interferometer and spatial coherence by two-aperture amplitude correlations in the far field. A clear understanding of the difference between temporal and spatial coherence, or between path-integrated frequency effects and differential phase changes across an aperture, helps one interpret the coherent differential Doppler technique.

1. Coherent System

For the geometry of FIG. 1, one may consider a wavelength $\lambda$, path length L, transverse velocity $V_T$, atmospheric structure parameter $C_n^2$, effective optical aperture for each beam in the system $D_e$, and beam separation d at the transmitter. The convergence angle $\phi$ is just $d/L$. Temporal phase fluctuations introduce an rms frequency modulation given by $$<\Delta f^2>^{\frac{1}{2}} = V_T D_e^{-1/6} (\lambda^{-2} L C_n^2)^{\frac{1}{2}}.$$

Strictly speaking, this expression applies only for collimated beams. This form may, however, be used as an approximation. To evaluate the range limit $L_T$, allowed by temporal coherence requirements, it is reasonable to require $<\Delta f^2>^{\frac{1}{2}}$ to be some small fraction of $f_T$ from equation (3), for example 1%. Applying this restriction results in a limit $$L_T = (10^{-2} \, d \, D_e^{1/6}/C_n)^{3}, \quad (4)$$

which is independent of wavelength. For typical atmospheric boundary layer values of $d = 0.3$ m, $D_e = 0.1$ m and $C_n = 3 \times 10^{-8} \, m^{-\frac{1}{3}}$ the range is limited to $$L_T = 1.67 \times 10^3 \, m$$

by temporal coherence considerations. $L_T$ increases with increasing beam separation so that longer coherent ranges are possible by using a larger geometry. This increase in range limit with d is a result of the larger $f_T$ associated with increasing convergence angle $\phi$.

2. Incoherent System

For an incoherent system that relies on fringe formation, the important coherence consideration is spatial coherence between the two beams that form the fringes. The effective aperture of the system for beam-to-beam coherence is the extreme ray separation d. The aperture over which the rms phase difference (fluctuation) is less than 1 rad is given by $$d = [2.9 \, (\lambda/2\pi)^{-2} \, L \, C_n^2]^{-3/5}.$$

This expression, valid for collimated beams, is used for the system focused at 33 m as an approximation for helpful range estimates as was done in the temporal coherence case. The spatial coherence limit on range, $L_S$, is then $$L_S = (\lambda/2\pi C_n)^2 \, d^{-5/3}/2.9. \quad (5)$$

For the same conditions as for the temporal limit, with $\lambda = 10.6 \times 10^{-6} m$, the range is limited to $$L_S = 8.11 \times 10^3 \, m$$

by spatial coherence considerations. Here the spatial coherence limit decreases with increasing beam separation, in contrast to the case for temporal coherence. To compare the infrared with the visible, it is more meaningful when changing range to fix the convergence angle than the beam separation d. Recasting equation (5) with convergence angle gives the expression $$L_S = [(\lambda/2\pi C_n)^2 \phi^{-5/3}/2.9]^{3/8},$$

which shows that the $\phi$-fixed range satisfying the spatial coherence criterion goes as $\lambda^{\frac{3}{4}}$. Using this ratio gives a limiting range for the visible $$L_S(\text{vis}) = 833 \, m,$$

which is less than the temporal limit in the infrared for a similar geometry.

The ratio $L_T/L_S$ indicates whether the coherent (heterodyne) or coherent (fringe) technique is more severely range limited. This ratio is given by $$L_T/L_S = 5.31 \, \lambda^{-2} \, C_n^{4/3} \, D_E^{1/9} \, d^{7/3},$$

and for the infrared conditions assumed has a value $L_T/L_S = 0.206$. In the infrared (for the assumed conditions) the coherent system, which relies on temporal coherence, is slightly more range-limited than the incoherent or fringe system, which is limited by spatial coherence. In the visible, however, the range limit for the coherent technique is predicted to be 80 times larger than that for the incoherent technique.

The discussion of atmospheric coherence limitations touches on only one aspect of the four-way remote-sensing systems comparisons among coherent and incoherent techniques operating in the infrared and the visible. The coherence considerations are intended to illuminate the coherent technique and to indicate that atmospheric refractive index fluctuations should not limit the reported experiment.

The values assumed for the examples above are based on a $C_n$ average for data taken 30 m above the surface. A smaller range limit would result for a $C_n$ of approximately $3 \times 10^{-7} m^{-\frac{1}{3}}$ observed in another experiment done 1.6 m above the terrain. In this case the temporal range limit given following equation (4) would be approximately 360 m. On the other hand, $C_n$ approximately equal to $1 \times 10^{-8} \, m^{-\frac{1}{3}}$ is more reasonable for a slant range at distances beyond 500 m. Values for the atmospheric structure parameter $C_n^2$ from experiments in the visible are used in the range limit estimates for infrared wavelengths (10.6 $\mu$m) also. Near strong infrared absorption lines the refractive index of air changes markedly, but at 10.6 $\mu$m the atmospheric transmission exhibits only very weak absorption features. In the absence of absorption lines, the difference between the refractive index of air and of vacuum $(n-1)$ changes by less than 5% over the region 0.6 $\mu$m to 10.6 $\mu$m. It is therefore reasonable to use the same value of $C_n^2$ for the visible and 10.6 $\mu$m wavelengths.

One may thus conclude that the coherent differential Doppler technique in the configuration described herein is not restricted by atmospheric coherence limitations to a range of at least 360 m. Observed fringes are not a reliable indicator of the possibility of efficient heterodyne detection of transverse velocities.

To be useful in the atmosphere as a remote probe, which implies a need to sample much larger volumes than are characteristic of laboratory Doppler velocimeters, as well as more stringent coherency requirements than for laboratory systems, a practical Doppler velocity measurement system must operate when a number of scattering targets with a distribution of velocities are present within the sampling region (focal volume). A distribution of velocity components with a characteristic spread $\delta V$ will give rise to frequency distributions of magnitude $$\delta f_L \sim 2\nu(\delta V)/c$$

and $$\delta f_T \sim \nu(\delta V)\phi/c \sim (\phi/2)\delta f_L. \quad (6)$$

The expressions above, and the order of magnitude arguments following, are not to be through of as equations applicable to all situations. Rather, the arguments discuss typical or generalized scale sizes. For example, the spread in longitudinal velocity components, $\delta V_L$, is approximately equal to that for the transverse component, $\delta V_T$, in typical boundary layer situations. For purposes of scaling argument it is sufficiently accurate to characterize the velocity spread by a representative value, $\delta V$.

In the Doppler lidar experience the range of the spread is typically given by $$0.1 \leq \delta V/V \leq 0.5. \tag{7}$$

Incidentally, this empirical observation for Doppler lidar is in contrast o the usually smaller spreads noted for Doppler radar. It is reasonable to expect lidar spreads to be larger than radar-derived values since the small tracers (typically 2-10 μm diameter) characteristic of lidar measurements should follow the fluctuations in the wind field more faithfully than do larger hydrometeors or chaff. The larger volume average of the radar will also tend to smooth out some of the variability present in the smaller lidar sensing volume. In any case, for small $\phi/2$ it is clear that $$\delta f_L >> f_T \tag{8}$$

and there is no hope of observing the triplet splitting due to transverse velocity components in the frequency region near $f_L$ when a number of targets with a distribution of velocities are present in the sensing volume. However, the intra-triplet beats are distributed only over a narrow frequency bandwidth $$\delta f_T < f_T$$

and are in fact observable in the frequency region near $f_T$. Frequency spectral analysis over the region 0 to $\sim 2f_L$ on either side of the heterodyne local oscillator offset gives a measure of the longitudinal velocity component and its variation for a scattering target, and spectral analysis in the region 0 to $\sim 2f_T$, where typically the scale relationships $f_T \sim (\phi/2)f_L \tan\phi$ and $\phi \leq 0.01$ are representative, gives a measure of the transverse velocity component and its variation. For unambiguous analysis, the local oscillator offset should be chosen to be significantly larger than the greater of $2f_T$ and $f_L$.

In addition to the signal triplet from each scattering center, additional noise frequencies may be considered. Frequencies from non-linearly detected intertriplet beats, when multiple scattering centers are simultaneously contributing to the signal, will cause noise in the frequency region near $f_T$. If there are n simultaneous scatters, an intra-triplet beat signal proportional to n will occur over a bandwidth $\delta f_T$, while an inter-triplet beat proportional to approximately $n^2$ (in the limit of large n) will be spread over a much larger bandwidth $\delta f_L$. For small n, the fact that $\delta f_T << \delta f_L$ will dominate the signal-to-noise situation so that the signal-to-noise ratio will increase with increasing number of scatterers. In the limit of very large n the signal-to-noise ratio near $f_T$ goes to zero. Since the intensity from the scatterers varies, the effective n for a particular situation can be chosen to be less than the actual n by setting an intensity threshold on the received signal spikes before the non-linear mixing occurs. The fact that some intermediate value of n, rather than the largest possible, is preferred indicates a possible preference for the infrared over the visible for measurement systems.

Comparison of this coherent differential Doppler technique with other transverse velocity measuring schemes helps to illuminate this method. Incoherent differential Doppler or incoherently-detected real fringe systems detect the amplitude modulation of the nearly back-scattered signal when inhomogeneities in the atmospheric aerosol distribution pass through the illuminated region. Although the signal-to-noise ratio analysis of such systems is difficult, the coherence requirement on the two beams forming the fringes, which leads to equation (5), must be satisfied to maintain good fringe contrast. Temporal coherence requirements apply to the so-called "coherent fringe system" discussed by Hughes and Pike in *Applied Optics*, 12, 597 (1973). In this context, coherency means that two scattered beams are collected by separate optical paths and combined at the detector, rather than considering the beam interference to occur at the scattering volume and then to be collected along a simple optical path as in the incoherent fringe system. This coherent fringe system does not involve the use of a local oscillator for heterodyne conversion. Applicant is not aware that such a coherent fringe system has been tried in the atmosphere at significant ranges, say beyond 10 m, although the analysis by Drain in *The Journal of Pysics*, D5, 481 (1972), suggests that coherent processing is preferred over incoherent when the number of particles involved in the scattering becomes large. None of these transverse techniques is effective in measuring the longitudinal component of velocity.

Operationally the coherent and incoherent techniques can be contrasted by considering velocity measurement where the target is a uniform, white diffuse scatterer such as a sheet of paper. No amplitude variations would be detected as the paper moved through the fringe system. However, the scattered light would be shifted in frequency and the frequency shift detected by a coherent system. Another contrast is apparent if one notes that the incoherent (fringe) technique is sensitive only to the velocity component perpendicular to the beam angle bisector, whereas the coherent technique measures only the longitudinal (line-of-sight) velocity component along the beam. The coherent differential Doppler method utilized here measures the small difference in two longitudinal components separated slightly in angle to determine the component transverse to the beam angle bisector.

The present full-coherent approach combines the differential Doppler geometry with the optical homodyne or heterodyne detection already successfully applied in the atmosphere for the longitudinal velocity component. The use of a local oscillator requires that the coherence limits of equation (4) must be satisfied if efficient heterodyning is to occur.

Figure 4:
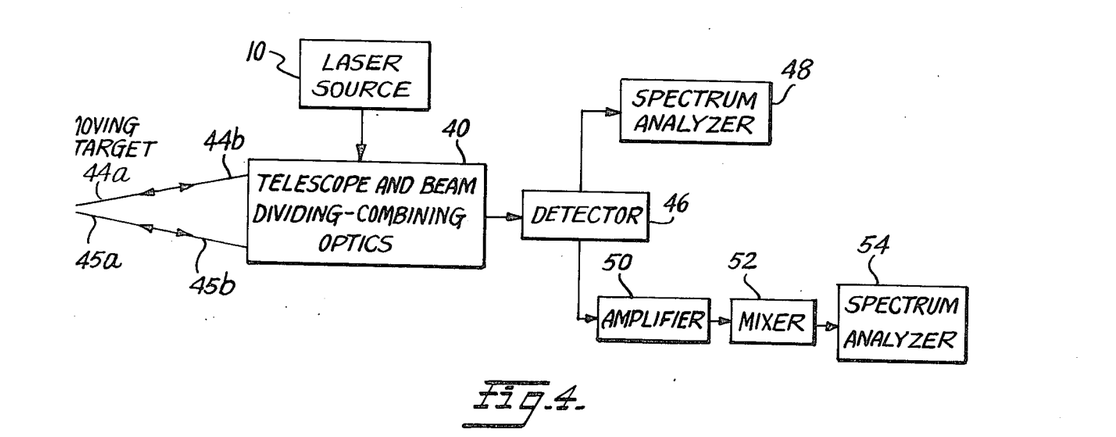
FIG. 4 is a schematic diagram of one embodiment of the present invention.

A block diagram of the apparatus of the invention is shown in FIG. 4. The telescope and beam dividing-combining optics 40, shown in FIG. 5, illuminate a moving target 42 with coherent electromagnetic radiation from laser source 10. Multiple targets (particles) with different velocities may simultaneously occupy the sensitive region of optics 40. For illustrative purposes, only one target 42 within the region of the intersection of the beams 44 and 45 is shown. The transmitted optical signals 44a and 45a are back-scattered or nearly back-scattered from target 42 as represented by target scattered signals 44b and 45b. Particle 42 will in general reflect light from each beam back along the same beam path as well as from one beam to the other beam path. The back-scattered signals 44b and 45b are combined with laser radiation from laser source 10 or a separate laser reference source (not shown) in detector 46. Laser source 10 thus serves as a local reference oscillator. The phase of this reference radiation should be such that it is temporally coherent with the back-scattered radiation. In the simplest case, a portion of the radiation from the laser source 10 itself may be used, thus ensuring temporal coherence. The target scattered signals 44b and 45b and the laser reference beam from laser source 10 mix in the detector 47 to produce a multiplicity of rf signals, comprising a frequency triplet for target 42. The rf signals may be measured directly by a conventional spectrum analyzer 48 to observe the frequency triplet particularly where a single particle is being measured. The rf signals may also be amplified by amplifier 50 and fed through a mixer 52, such as a diode, or other non-linear device. The resulting intra-triplet beat signal can be measured by a second spectrum analyzer 54 to observe the intra-triplet difference frequency corresponding to the velocity component of target 42 perpendicular to a line between the target and transmitting optics 40 in the plane of the two transmitted and target scattered beams 44 and 45. The intra-triplet beat spectrum is particularly important when a plurality of particles occupy the beam intersecting area inasmuch as the triplet spectrum is typically not resolved.

Figure 5:
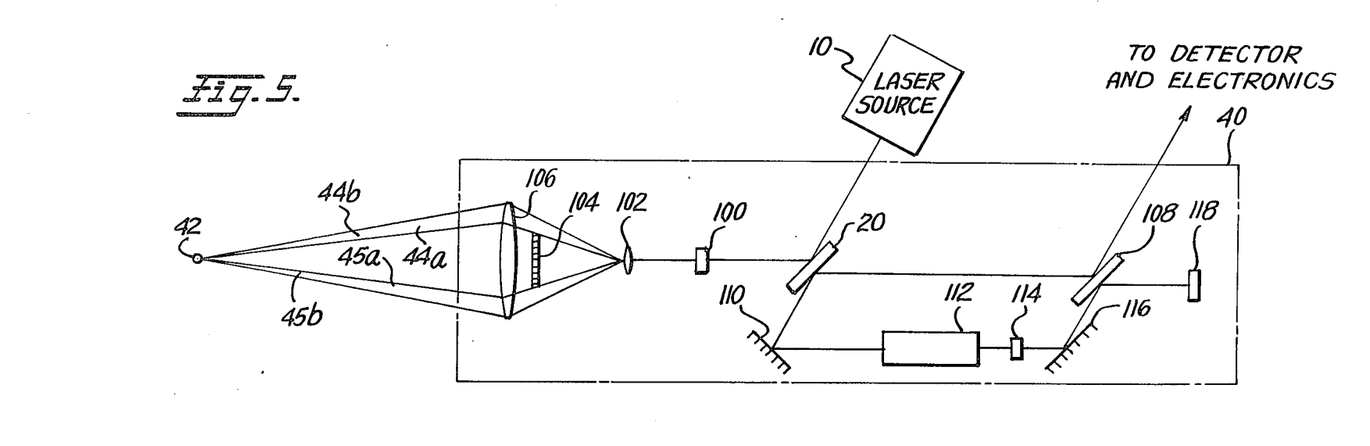
FIG. 5 is a schematic diagram of one embodiment of telescope and beam dividing-combining optics for use with the invention of FIG. 4.

One embodiment of optics 40 is shown in FIG. 5. The optical arrangement is designed specifically for use with a linearly polarized laser source which together with appropriate quarter wave ($\lambda/4$) and half wave ($\lambda/2$) plates results in a highly efficient system. Laser source 10 generates a laser beam which is directed toward beam splitter 20 which reflects most of the beam to a $\lambda/4$ wave retardation plate 100. The electromagnetic radiation transmitted through wave ratardation plate 100 is focused by a telescope input lens 102 onto a telescope primary element 106. A beam stop 104 creates two beams by masking the telescope primary element 106. In practice, the primary element 106 may be an f/4 mirror in Newtonian arrangement. The transmitted beams 44a and 45a then strike the target 42 and beams 44b and 45b are reflected back, superimposed on beams 44a and 45a respectively and pass through the telescope primary element 106, the telescope input lens 102, and the $\lambda/4$ wave retardation plate 100. Beam splitter 200 passes this returned radiation to beam splitter 108, whose output is transmitted to the detector 46 and associated electronics illustrated in FIG. 4. The reference source of radiation is derived from source 10 via beam splitter 20, a mirror 110, an attenuator 112, a $\lambda/2$ wave retardation plate 114, a second mirror 116, and the beam splitter 108. Radiation along this path serves as the reference (local oscillator) beam and is mixed within the returned radiation in detector 46. Element 118 is an absorber to absorb the light reflected by beam splitter 108.

Figure 6:
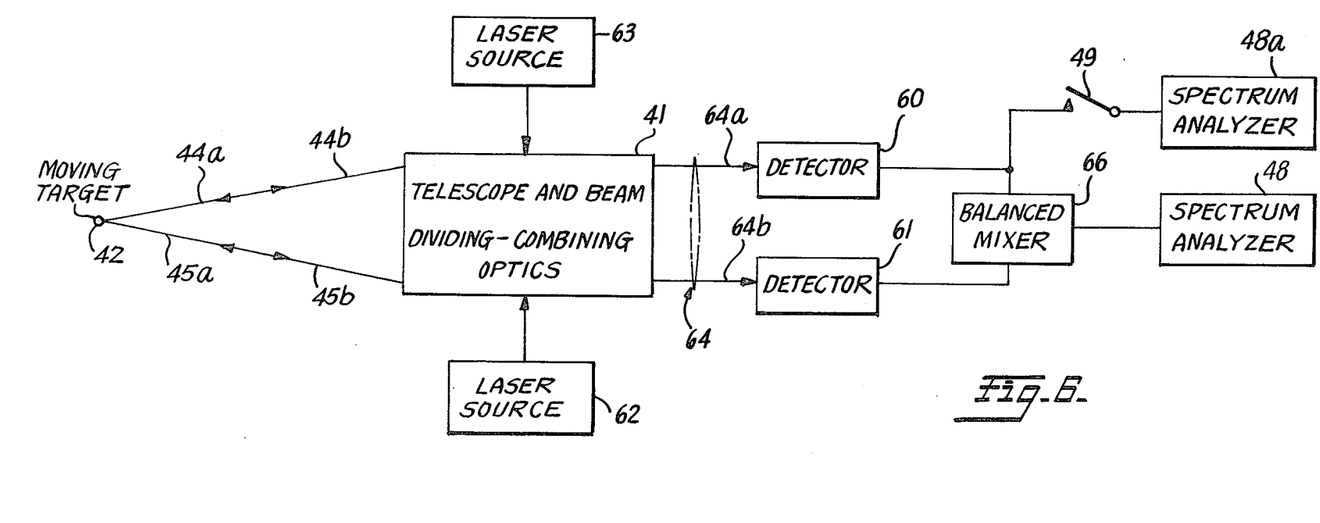
FIG. 6 is a schematic diagram of a preferred embodiment of the present invention.

A preferred embodiment of the present invention is shown in FIG. 6. This embodiment utilizes two detectors 60 and 61, one for each transmit-target back-scatter (receive) beam 44b and 45b. Two laser sources 62 and 63 having a fixed frequency relationship used to allow determination of the longitudinal and transverse velocity components. A single source may alternatively be utilized with appropriate beam splitting optics to derive two beams. In practice, the use of two different frequency sources permits data to be analyzed more easily by causing peak separation in frequency space. In this embodiment, each optical detector 60 and 61 mixes the received backscattered beam with its own respective laser source 62 and 63 used as reference radiation, and the resulting radio frequency signal spectrum from each detector is a couplet. Each couplet contains half of the main peak and either of the smaller peaks of the single-detector triplet (corresponding to the sidelobe spectrum). Thus, if the two couplets were added together, the result would be the triplet heretofore described.

Either one of these couplets may be fed into spectrum analyzer 48a through switch 49 to obtain a signal whose frequency is approximately proportional to the longitudinal velocity component of the particle. Both of the rf pairs in couplets 64 may be mixed in a balanced mixer 66 to obtain the intra-couplet beat frequency difference and then observed with a spectrum analyzer 48. The intra-couplet beat difference frequency is proportional to the transverse velocity component of the particle.

Figure 7:
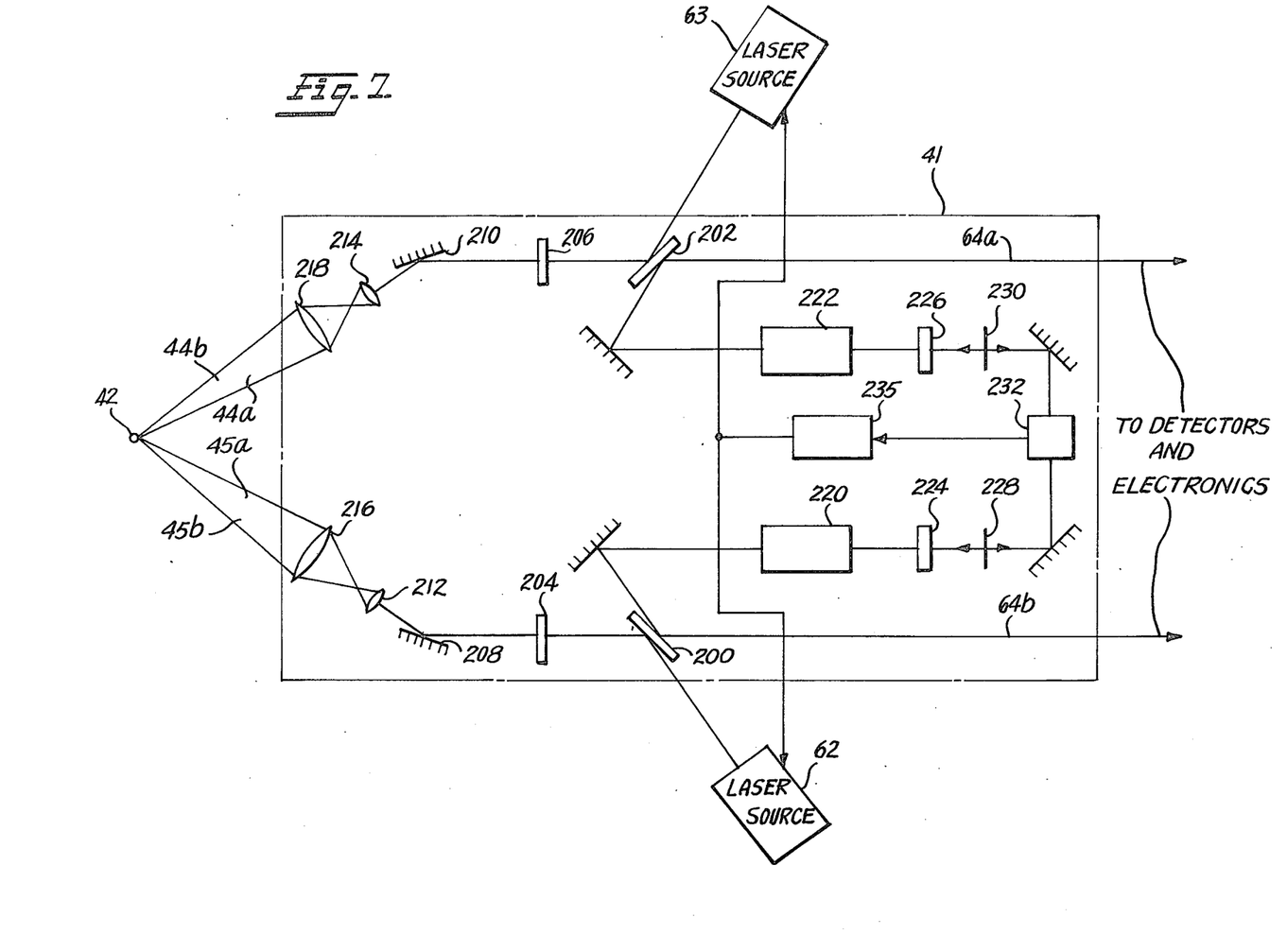
FIG. 7 is a schematic diagram of a preferred embodiment of telescope and beam dividing-combining optics for use with the preferred embodiment of the invention of FIG. 6.

FIG. 7 illustrates an embodiment of optics 41 for use with the preferred embodiment of the invention of FIG. 6. Two laser sources 62 and 63 each transmit a beam to their respective beam splitters 200 and 202 which reflect the resulting beams through $\lambda/4$ wave retardation plates 204 and 206. The beams are then reflected by mirrors 208 and 210 onto telescope input lenses 212 and 214. The beam from each lens 212 and 214 is transmitted through the respective telescope primary elements 216 and 218 to the target 42 where the beams are reflected. The reflected or back-scattered beams 44b and 45b are again transmitted through the telescope primary elements 216 and 218, the telescope input lenses 212 and 214, reflected by mirrors 208 and 210, and transmitted by wave retardation plates 204 and 206 onto beam splitters 200 and 202. The beams from the beam splitters are passed along lines 64a and 64b to their respective detectors 60 and 61. Radiation from sources 62 and 63 are transmitted through respective beam splitters 200 and 202, attenuator 220 and 222, $\lambda/4$ wave retardation plates 224 and 226, and transmitted through partially reflecting mirrors 228 and 230. The partially reflecting mirrors reflect radiation back through their respective $\lambda/4$ plates, attenuators, and beam splitters for use as the local oscillator or reference beam for mixing in detectors 60 and 61. Radiation which is not reflected back from partially reflecting mirrors 228 and 230 is transmitted to a detector 232 which detects the frequency difference (beat) between these reference sources. An electronical signal representative of this reference beat is fed to frequency lock electronics 235 which is used to control sources 62 and 63. Obviously, if only a single laser is utilized, the detector 232 and frequency lock electronics 235 may be omitted.

The measurement of all three components of velocity of moving target 42 is most easily achieved by rotating the stop 104 or the telescope pair in FIG. 7 by ninety degrees and repeating the measurement as described. Alternatively, an additional out-of-plane beam or beams may be used in the apparatus of FIG. 7 to allow measurement of the other transverse velocity component.

Some typical components which may comprise the elements of the disclosed invention include: for laser source 10, 62 and 63, a continuous wave $CO_2$ Sylvania laser Model #948; for the wave retardation plates 100, 114, 204, 206, 225 and 226, CdS plates manufactured by Cleveland Crystals, Inc.; for attenuator 112, Sylvania Model #485; for the mirrors 110, 116, 208 and 210, front-surface aluminized flat mirrors; for detectors 46, 60, 61 and 232, HgCdTe, IR detectors, Class A1, available from Eltek in New York; for amplifier 50, C-Cor Model 4376-A (40db); for mixer 52, MA4883 or IN23C R.F. diodes; for balanced mixer 66, rf mixer HP10534A; and for spectrum analyzers 48, 48a and 54, Model 8553B/8552B manufactured by Hewlett-Packard and used in conjunction with an Avantek UAA-1170B preamplifer. The phase lock electronics may be fabricated, for example, from a two level dicriminator (model DT1004 supplied by RHG of Deer Park, N.Y.) and integrated op amps, model No. LN0042.

An essential difference and advantage between the invention disclosed and other multi-beam velocity sensors is that in the instant invention, the target-scattered (received) signal is not directly detected at ome arbitrary angle, but instead is detected along the transmitted paths and then united with reference optical radiation. The resulting optical beat between the signal and reference is then processed to yield the desired velocity information.

Although the invention has been described in terms of selected preferred embodiments, the invention should not be deemed limited thereto, since other embodiments and modifications will readily occur to one skilled in the art. It is therefore to be understood that the appended claims are intended to cover all such modifications as fall within the true spirit and scope of the invention.

I claim:

1. A method of measuring velocity components of a plurality of particles comprising:
   (a) generating first and second coherent radiation beams;
   (b) directing said first and second radiation beams toward said plurality of particles, said beams being spaced apart and positioned to intersect each other in a region of said plurality of particles, said plurality of particles generally having a longitudinal velocity component along the bisector of said beams and a transverse velocity component perpendicular thereto in the plane defined by the beams;
   (c) receiving Doppler shifted radiation back-scattered from said plurality of particles along the direction of said first and second beams;
   (d) mixing temporally coherent reference radiation with said received Doppler-shifted radiation for detecting a beat frequency spectrum; and
   (e) determining from the beat frequency values of said beat frequency spectrum the longitudinal and transverse velocity components of said plurality of particles, said longitudinal component determined from the average value of a peak in said spectrum and said transverse component determined from the average value of the difference between said peak and a sideband of said peak.

2. The method of claim 1, wherein said beat frequency spectrum comprises a sum of triplets, each triplet having a main peak and two sidebands of smaller amplitude spaced on either side of and equidistant therefrom.

3. The method of claim 1, wherein said beat frequency spectrum comprises two sums of couplets, one sum in each of two detectors, each couplet having a main peak of equal amplitude at the same frequency, and each couplet having another peak, wherein each of said other peaks is spaced equidistant from its respective main peak, but in one set of couplets is shifted up in frequency and in the other, down in frequency from the respective main peak.

4. The method of claim 2, wherein said step of determining the longitudinal and transverse velocity components from the frequency values of said sum of triplets comprises the steps of:
   (a) determining the average frequency value of said main peak of said sum of triplets, said average frequency value being proportional to the average longitudinal velocity component of said plurality of particles; and
   (b) determining the value of the average sideband frequency spacing from said main peak of each triplet, said average spacing value proportional to the average transverse velocity component of said plurality of particles.

5. The method of claim 4, wherein said step of determining the value of the average sideband frequency spacing comprises the step of mixing together the sum triplet frequency spectrum to obtain an intra-triplet beat frequency spectrum having a main lobe and a sidelobe, and determining the frequency spacing between said main lobe and zero frequency, said frequency spacing equivalent to the frequency spacing between the main lobe and sidelobe, said frequency spacing equal to the value of said sideband frequency spacing from said main peak.

6. The method of claim 5, further including the step of amplifying said triplet spectrum prior to said mixing step.

7. The method of claim 3, wherein said step of determining the longitudinal and transverse velocity components from the frequency values of said two sums of couplets comprises the steps of:
   (a) determining the average frequency of each of said sums of couplets, the average of said sums of couplets average frequencies being proportional to the average longitudinal velocity component of said plurality of particles;
   (b) mixing together said main peak and said corresponding another peak of at least one of said sums of couplets to obtain an intra-couplet frequency spectrum; and
   (c) determining from said intra-couplet frequency spectrum the average transverse velocity components of said plurality of particles.

8. The method of claim 7, wherein the mixing step comprises mixing together said main peak and said corresponding another peak of both of said sums of couplets in a balanced mixer for obtaining said intra-couplet frequency spectrum.

9. Apparatus for measuring the velocity components of a plurality of particles, comprising:
   (a) means for generating first and second coherent radiation beams;
   (b) means for directing said first and second radiation beams toward said plurality of particles, said beams being spaced apart and positioned to intersect each other in a region of said particles, said particles having a longitudinal velocity component along the bisector of said beams and a transverse velocity component perpendicular thereto and in the plane defined by said beams;
   (c) means for receiving Doppler shifted radiation backscattered from said first and second beams;
   (d) a reference beam of radiation temporally coherent with said first and second coherent beams;
   (e) means for mixing said received radiation with said reference radiation for detecting a beat frequency spectrum; and
   (f) means connected to receive said beat frequency spectrum for determining from the frequency values of said beat frequency spectrum, the longitudinal and transverse velocity components of said plurality of particles, said longitudinal component determined from the average value of a peak in said spectrum and said transverse component determined from the average value of the difference between said peak and a sideband of said peak.

10. The apparatus of claim 9, wherein said means for generating first and second coherent radiation beams comprises a laser source and a beam divider.

11. The apparatus of claim 9, wherein said means for generating a first and second coherent radiation beam comprises two laser sources having a fixed frequency relationship.

12. The apparatus of claim 11, wherein said source of temporally coherent reference radiation comprises one of said laser sources.

13. The apparatus of claims 9, 10 or 11 wherein the frequency of said radiation is comprised of frequencies within the infrared frequency spectrum.

14. The apparatus of claim 9, wherein said beat frequency spectrum comprises a sum of triplets, each triplet having a main peak and two smaller sidebands spaced equidistant therefrom.

15. The apparatus of claim 9, wherein said means for receiving comprises two detectors, said beat frequency spectrum comprises two sums of couplets, one in each of two detectors, each couplet having a main peak of equal amplitude at the same frequency, and each couplet having another peak, wherein each of said other peaks is of equal amplitude and is spaced equidistant from its respective main peak, but in one set of couplets is shifted up in frequency and in the other, down in frequency from the respective main peak.

16. The apparatus of claim 11, wherein said two laser sources have different frequencies and said source of reference radiation comprises said two laser sources, one associated with each of the first and second coherent radiation beams.

17. The apparatus of claim 14, wherein said means for determining the average frequency values of said sum of triplets comprises a first spectrum analyzer.

18. The apparatus of claim 14, wherein said means for determining the average frequency values of said sideband spacing in said triplets comprises, in combination:
  (a) means for amplifying said detected sum of triplets;
  (b) means for non-linearly mixing said amplified sum of triplets together for providing an intra-triplet spectrum; and
  (c) a spectrum analyzer connected to receive said intra-triplet spectrum.

19. The apparatus of claim 15, wherein said means for determining the average frequency values of said two sums of couplets comprises a spectrum analyzer.

20. The apparatus of claim 15, wherein said means for determining the average frequency values of said sidelobe spacing in said two couplets comprises, in combination:
  (a) a balanced mixing means for providing an intra-couplet spectrum; and
  (b) a spectrum analyzer connected for receiving said intra-couplet spectrum.

21. A method of measuring velocity components of a particle comprising:
  (a) generating first and second coherent radiation beams;
  (b) directing said first and second radiation beams toward said particle, said beams being spaced apart and positioned to intersect each other in a region of said particle, said particle generally having a longitudinal velocity component along the bisector of said beams and transverse velocity component perpendicular thereto in the plane defined by the beams;
  (c) receiving Doppler-shifted radiation back-scattered from said particle along the direction of said first and second beams;
  (d) mixing temporally coherent reference radiation with said received Doppler-shifted radiation for detecting a beat frequency spectrum; and
  (e) determining from the beat frequency values of said beat frequency spectrum the longitudinal and transverse velocity components of said particle, said longitudinal component determined from a peak in said spectrum and said transverse component determined from the difference between said peak and a sideband of said peak.

22. The method of claim 21, wherein said beat frequency spectrum comprises a triplet having a main peak and two sidebands of smaller amplitude spaced on either side of and equidistant therefrom.

23. The method of claim 21, wherein said beat frequency spectrum comprises two couplets, one in each of two detectors, each couplet having a main peak of equal amplitude at the same frequency, and each couplet having another peak of equal amplitude, wherein each of said other peaks is spaced equidistant from its respective main peak, but in one couplet is shifted up in frequency and in the other, down in frequency from the respective main peak.

24. The method of claim 22, wherein said step of determining the longitudinal and transverse velocity components from the frequency values of said triplet comprises the steps of:
  (a) determining the frequency value of said main peak of said triplet, said frequency value being proportional to the longitudinal velocity component of said particle; and
  (b) determining the value of the sideband frequency spacing from said main peak, said spacing value proportional to the transverse velocity component of said particle.

25. The method of claim 24, wherein said step of determining the value of the sideband frequency spacing comprises the step of mixing together the triplet frequency spectrum to obtain an intra-triplet beat frequency spectrum having a main lobe and a sidelobe, and determining the frequency spacing between said main lobe and zero frequency, said frequency spacing equivalent to the frequency spacing between the main lobe and sidelobe, said frequency spacing equal to the value of said sideband frequency spacing from said main peak.

26. The method of claim 25, further including the step of amplifying said triplet spectrum prior to said mixing step.

27. The method of claim 23, wherein said step of determining the longitudinal and trasverse velocity components from the frequency values of said two couplets comprises the steps of:
  (a) determining the frequency of the main peak of one of said couplets, said frequency being proportional to the longitudinal velocity component of said particle;
  (b) mixing together siad main peak and said corresponding another peak of at least one of said couplets to obtain an intra-couplet spectrum; and
  (c) determining from said intra-couplet frequency spectrum the transverse velocity component of said particle.

28. The method of claim 27, wherein the mixing step comprises mixing together said main peak and said corresponding another peak of both of said couplets in a balanced mixer for obtaining said intra-couplet frequency spectrum.

29. The method of claim 1, further comprising the step of rotating the plane of said first and second radiation beams to define a ninety degree rotated plane and repeating steps (a)–(e) for said rotated plane to determine a third velocity componenet perpendicular to said longitudinal and transverse components.

30. The method of claim 21, further comprising the step of rotating the plane of said first and second radiation beams to define a ninety degree rotated plane and repeating steps (a)–(e) for said rotated plane to determine a third velocity component perpendicular to said longitudinal and transverse components.

* * * * *